(12) United States Patent
Schütz

(10) Patent No.: US 11,440,496 B2
(45) Date of Patent: Sep. 13, 2022

(54) BEARING UNIT, STEERING-WHEEL SUBASSEMBLY AND METHOD FOR PRODUCING A VEHICLE SUBASSEMBLY

(71) Applicant: TRW AUTOMOTIVE SAFETY SYSTEMS GMBH, Aschaffenburg (DE)

(72) Inventor: Dominik Schütz, Heimbuchenthal (DE)

(73) Assignee: TRW AUTOMOTIVE SAFETY SYSTEMS GMBH, Aschaffenburg (DE)

( * ) Notice: Subject to any disclaimer, the term of this patent is extended or adjusted under 35 U.S.C. 154(b) by 217 days.

(21) Appl. No.: 16/483,491

(22) PCT Filed: Jan. 19, 2018

(86) PCT No.: PCT/EP2018/051260
§ 371 (c)(1),
(2) Date: Aug. 5, 2019

(87) PCT Pub. No.: WO2018/145875
PCT Pub. Date: Aug. 16, 2018

(65) Prior Publication Data
US 2020/0017056 A1 Jan. 16, 2020

(30) Foreign Application Priority Data
Feb. 8, 2017 (DE) .......................... 102017102463.8

(51) Int. Cl.
*B60R 21/203* (2006.01)
*B62D 1/04* (2006.01)
*F16C 35/02* (2006.01)

(52) U.S. Cl.
CPC ............ *B60R 21/2035* (2013.01); *B62D 1/04* (2013.01); *F16C 35/02* (2013.01)

(58) Field of Classification Search
CPC ..................... B60R 21/2035; B60R 21/2037
See application file for complete search history.

(56) References Cited

U.S. PATENT DOCUMENTS

| 5,340,258 A | * | 8/1994 | Simon | F16B 35/005 411/339 |
| 5,556,125 A | * | 9/1996 | Ricks | B60R 21/2035 24/453 |
| 5,924,831 A | | 7/1999 | Ricks et al. | |

(Continued)

FOREIGN PATENT DOCUMENTS

| CN | 112172909 A | * | 1/2021 | ............... B62D 1/11 |
| CN | 112739931 A | * | 4/2021 | ............ F16F 15/085 |

(Continued)

*Primary Examiner* — Nicole T Verley
(74) *Attorney, Agent, or Firm* — Tarolli, Sundheim, Covell & Tummnio LLP

(57) ABSTRACT

A description is given of a bearing unit of a vehicle subassembly, wherein the vehicle subassembly has a vehicle-mounted support, in particular a vehicle steering wheel (10), and a component which is to be fastened on the support, in particular an airbag module. The baring unit comprises at least one adjustable spacer element (14a, 14b, 14c) for orienting the position of the component on the support. Also provided are a bearing unit having a plurality of spacer elements (14a) which can be adjusted independently of one another and a steering wheel subassembly having a vehicle steering wheel (10) and an airbag module, wherein the vehicle steering wheel (10) and the airbag module are connected to each other by the bearing unit. The invention additionally relates to a method for producing a vehicle subassembly having a vehicle-mounted support, a component which is to be fastened on the support and at least one bearing unit.

17 Claims, 4 Drawing Sheets

(56) References Cited

U.S. PATENT DOCUMENTS

| | | | |
|---|---|---|---|
| 6,119,546 A | 9/2000 | Steffens, Jr. et al. | |
| 7,226,263 B2 * | 6/2007 | Schwarzbich | F16B 5/0233 |
| | | | 403/374.3 |
| 7,992,813 B2 * | 8/2011 | Wakamatsu | B02C 7/14 |
| | | | 241/86 |
| 8,202,033 B2 * | 6/2012 | Choi | B62D 25/147 |
| | | | 411/546 |
| 9,365,177 B2 | 6/2016 | Bachmann et al. | |
| 10,023,221 B2 * | 7/2018 | Obayashi | B60Q 5/003 |
| 10,220,886 B2 | 3/2019 | Sahi et al. | |
| 10,875,564 B2 * | 12/2020 | Minami | B60R 21/2037 |
| 11,111,949 B2 * | 9/2021 | Brautigam | B60Q 1/2626 |
| 2001/0054810 A1 | 12/2001 | Sakane et al. | |
| 2002/0125698 A1 * | 9/2002 | Schutz | B62D 1/04 |
| | | | 280/731 |
| 2004/0262135 A1 * | 12/2004 | Sugimoto | B60R 21/2037 |
| | | | 200/61.54 |
| 2012/0292895 A1 * | 11/2012 | Schutz | B60R 21/2037 |
| | | | 280/731 |
| 2013/0076011 A1 * | 3/2013 | Umemura | B60Q 5/003 |
| | | | 280/728.2 |
| 2014/0131982 A1 * | 5/2014 | Ishii | B60R 21/2037 |
| | | | 280/728.2 |
| 2014/0217711 A1 * | 8/2014 | Strecker | B60R 21/203 |
| | | | 280/731 |
| 2018/0134243 A1 * | 5/2018 | Ishii | B60R 21/01 |
| 2020/0189657 A1 * | 6/2020 | Gothekar | B62D 7/222 |
| 2020/0398782 A1 * | 12/2020 | Mills | B60R 21/215 |

FOREIGN PATENT DOCUMENTS

| | | | | |
|---|---|---|---|---|
| DE | 102006005642 | | 8/2007 | |
| DE | 102014002785 A1 * | | 9/2015 | B60R 21/2037 |
| DE | 102014006299 | | 11/2015 | |
| DE | 202017104817 U1 * | | 9/2017 | B60R 21/235 |
| EP | 3499076 A1 * | | 6/2019 | F16F 3/0873 |
| JP | 2017197098 A * | | 11/2017 | |
| WO | WO-2010025929 A1 * | | 3/2010 | B60R 21/2037 |
| WO | WO-2013037497 A1 * | | 3/2013 | B62D 1/04 |

\* cited by examiner

BEARING UNIT, STEERING-WHEEL SUBASSEMBLY AND METHOD FOR PRODUCING A VEHICLE SUBASSEMBLY

RELATED APPLICATIONS

This application corresponds to PCT/EP2018/051260 filed Jan. 19, 2018, which claims the benefit of German Application No. 10 2017 102 463.8 filed Feb. 8, 2017, the subject matter of which are incorporated herein by reference in their entirety.

BACKGROUND OF THE INVENTION

The present invention relates to a bearing unit of a vehicle subassembly, wherein the vehicle subassembly has a vehicle-mounted support and a component which is to be fastened on the support.

Further, the present invention relates to a steering-wheel subassembly having a vehicle steering wheel and an airbag module as well as to a method for producing a vehicle subassembly having a vehicle-side support, a component which is to be fastened on the support and at least one bearing unit.

In numerous vehicle subassemblies, especially in the vehicle interior, a component is fastened to a vehicle-mounted support. One example of a vehicle subassembly of this type is a vehicle steering wheel which constitutes a support and an airbag module fastened thereon which constitutes the component.

For optical reasons, it is desired that the clearances between the support or a support-side lining and the component are as uniform and narrow as possible and that transitions are preferably free from steps. Furthermore, the functions of the component and the support have to be prevented from being restricted. Since clearances required in the automotive sector, especially in the interior of a vehicle, are below the added manufacturing tolerances of the individual components, higher accuracy and uniformity of the clearances can only be realized by reducing the manufacturing tolerances of the components. However, this involves a substantially greater manufacturing effort, thus resulting in higher manufacturing costs.

In order to tackle said problems, it is known to provide bearing faces on the component and/or on the support. The bearing faces are then adapted to the currently given tolerances within the scope of a reworking step. However, a reworking step also means additional manufacturing expenditure. At the same time, prior to reworking, the currently provided component dimensions have to be exactly defined to determine to which extent the component has to be reworked.

In addition, it is known to use intermediate components, e.g. in the form of spacers, and thus to compensate for the existing manufacturing tolerances. In this case, either the intermediate components have to be adapted to the existing tolerances or the intermediate components have to be appropriately selected from a range. When mounting the component on the support, the intermediate component then constitutes an additional element. In this way, likewise an additional effort as well as costs for the intermediate component are incurred.

Further, the use of eccentrics for adjusting purposes is known. Accordingly, e.g. eccentric screw heads are used. Depending on the position of the eccentric in space, a distance thus can be adjusted between a support and a component. It is a drawback of eccentrics that they have only a very restricted adjusting range in a previously defined direction. Hence, statistically and thus unpredictably distributed tolerances can be completely compensated in exceptional cases only.

The document DE 10 2012 002 722 A1 is cited as an example of a vehicle subassembly in which an airbag module is fastened to a vehicle steering wheel. In said document, a method and a device for manufacturing a vehicle subassembly, a bearing unit, a vehicle steering wheel, a horn module for a steering wheel subassembly as well as a steering wheel subassembly are illustrated. The bearing parts used in this case have humps that can be locally fused by means of an ultrasonic welding process. In this way, the component, in this case the airbag or horn module, can be oriented relative to the support, viz. the steering wheel in this case.

SUMMARY OF THE INVENTION

It is the object of the present invention to provide a bearing unit by which especially simple, low-effort and accurate orientation of a component relative to a support is possible.

According to the invention, this object is achieved by a bearing unit of a vehicle subassembly, wherein the vehicle subassembly has a vehicle-mounted support, especially a vehicle steering wheel, and a component to be fastened on the support, especially an airbag module, comprising at least one adjustable spacer element for orienting the position of the component on the support and a first fastener by which the support or the component can be fixed to the spacer element. The spacer element includes a support-side holding member comprising a first thread, a component-side holding member comprising a second thread, and a second fastener by which the support-side holding member can be fixed to the support. The second thread engages in the first thread in such a manner that the length of the spacer element is changed by a rotational movement of the support-side holding member relative to the component-side holding member. By the two threads a possibility of orienting the component relative to the support in a simple manner has been found. Consequently, the threads enable low-effort, though precise orientation. Threads are standard elements in the field of automotive engineering so that they can be manufactured at low cost. Moreover, the threads enable the spacer element to be re-adjusted as to its length with low effort. According to a preferred configuration variant of the bearing unit, the first fastener is a component-side fastener and the second fastener is a support-side fastener.

One development provides that the support-side holding member or the component-side holding member is in the form of a nut and the other one of the two holding members is especially in the form of a sleeve turned into the nut. This design results in a simple and thus inexpensively producible structure. Furthermore, a support-side fastener can be countersunk in the spacer element by the sleeve.

Of preference, the nut at least in portions includes a toothing on its outer circumferential surface. Said toothing enables the nut to be rotated relative to the sleeve by simple means. Thus, the rapid adjustment of the length of the spacer element is facilitated. Via the toothing the nut can also be rotated by a tool operated manually or by automation, e.g. a counter-gearwheel meshing with the toothing of the nut. Consequently, the effort for mounting and the adjustment of the length of the spacer element are reduced.

According to one embodiment, the first fastener especially arranged on the component side comprises a stop spring adapted to be fastened, on the one hand, on the component-side holding member and, on the other hand, on the component to couple the component to the spacer element in a simple and easily releasable manner. The stop spring thus constitutes a universal interface which has proven itself in many cases.

Further, a holding fixture may be formed integrally on the component-side holding member, into which holding fixture the stop spring can be inserted and which supports said stop spring, especially with the holding fixture being an integrally formed hook. Thus, simple and low-cost producibility of the holding fixture is ensured. For example, the holding fixture may be integrally formed on the component-side holding member by injection molding. At the same time, a safe receipt of the stop spring is guaranteed in this way.

According to one development of the invention, the second fastener especially arranged on the support side is a screw projecting through through-holes in the support-side and component-side holding members which can be screwed into the support, thus altogether resulting in simple fastening.

Preferably, the through-hole in the component-side holding member includes a step for abutment of the screw head and/or the through-hole is oversize compared to the screw so that the spacer element is displaceable transversely to the longitudinal screw axis relative to the screw that is not yet tightened. In this way, the spacer element can be displaced in a plane and thus can be oriented relative to the support. The combination of the step and the oversize through-hole can be easily manufactured at low cost.

In particular, the bearing unit may include plural, preferably three, spacer elements adjustable independently of each other, especially wherein the component-side fastener is supported on all spacer elements. All of the three spacer elements can be displaced in a plane predefined by the support and can be adjusted as to their length. This enables orientation of the component relative to the support in three translational degrees of freedom and three rotational degrees of freedom. In total, the component thus can be oriented in all six degrees of freedom present in space. Two of the translational degrees of freedom are located in the plane predefined by the support. The third translational degree of freedom is given by the option of varying the length of the spacer elements. The rotational degrees of freedom are realized by the option of independently adjusting the spacer elements. When e.g. the component is held by three spacer elements, the length of two spacer elements can be maintained and the length of the third spacer element can be varied and adapted. Fastening by three spacer elements is technically and economically ideal. However, adjustability in six degrees of freedom can also be achieved by more than three spacer elements.

Moreover, the object is achieved by a vehicle steering-wheel subassembly having a vehicle steering wheel and an airbag module, wherein the vehicle steering wheel and the airbag module are connected to each other by one or more, preferably three, bearing units according to the invention. As afore-described in general form, orientation of the airbag module relative to the vehicle steering wheel is thus possible in three translational degrees of freedom and three rotational degrees of freedom. In this way, it is possible to orient the airbag module relative to the steering wheel in an optically perfect manner.

In addition, the object is achieved by a method for producing a vehicle subassembly having a vehicle-mounted support, especially a vehicle steering wheel, a component which is to be fastened on the support, especially an airbag module, and at least one bearing unit according to the invention. The method comprises the following steps of:
 a) arranging at least one adjustable spacer element relative to the support,
 b) rotating either of the two holding members relative to the other one of the two holding members for adjusting the length of the spacer element,
 c) locking the support-side fastener and thus the adjusted spacer element on the support, and
 d) locking the component by attaching the component-side fastener to the component and to the spacer element.

In this way, a simple option for mounting a component on a support is given, wherein the position of the component may be oriented at the support.

Preferably, in step a) the spacer element is arranged at a distance from the support and in step b) either of the two holding members is rotated relative to the other one so that the spacer element axially abuts on the support. The distance from the support may formed e.g. by the fact that the spacer element is arranged fully automatically in an orientation plane spaced apart from the support. The orientation plane may correspond to the ideal type of plane for the spacer elements. A distance from the support may occur due to the fact that the support shows manufacturing tolerances. By subsequently adjusting the spacer element until the latter abuts on the support, said manufacturing tolerances are compensated. This method permits to exactly compensate for the existing manufacturing tolerances without having to detect the exact dimensions of the support.

One development provides that the rotation in step b) is force-controlled by means of a motor-driven tool and/or is completely automated. This ensures rapid and reproducible adjustment of the spacer element. Abutment of the spacer element on the support can be sensed by means of the force control. For example, a so-called torque wrench may be used to carry out step b).

In addition, in step c) the support-side or the component-side holding member may be in the form of a nut and may be made to rotate via a toothing arranged at least in portions on an outer circumferential surface of the nut, especially via a motor-driven tool. This is a simple and low-cost option to rotate the nut in an automated manner and thus to adjust the spacer element.

The invention moreover may be configured so that the support-side fastener is a screw which, prior to step b), is screwed into the support without being axially twisted so that in step b) the spacer element may be varied in its length, and that as late as in step c) the screw is tightened. The screw at first serves as a captive member and then for fastening. The first screwing helps to secure the spacer element and the screw against getting lost. Only then is the adjustment performed by varying the length. In this way, the method is less susceptible to faults.

In a variant, the at least one spacer element is laterally displaced prior to step c) so that it has a desired lateral orientation relative to the support.

Of preference, three adjustable spacer elements which are preferably adjustable independently of each other are employed. Hence, when using three adjustable spacer elements, adjustability in three translational degrees of freedom and three rotational degrees of freedom, viz. in all degrees of freedom available in space, is resulting.

According to one development, in step a) plural, preferably all of the spacer elements can be held orientated relative to each other in a tool, can be moved toward and oriented relative to the support. The spacer elements may be arranged within the tool in a plane of orientation. Thus, the spacer elements are also mounted in the support such that the component-side holding members of the spacer elements are located in the plane of orientation and the manufacturing tolerances of the support are compensated. For this purpose, it is not necessary to detect the dimensions of the support.

BRIEF DESCRIPTION OF THE DRAWINGS

Hereinafter, the invention shall be illustrated in detail by way of the enclosed drawings using an example, wherein.

DESCRIPTION

Figure 1:
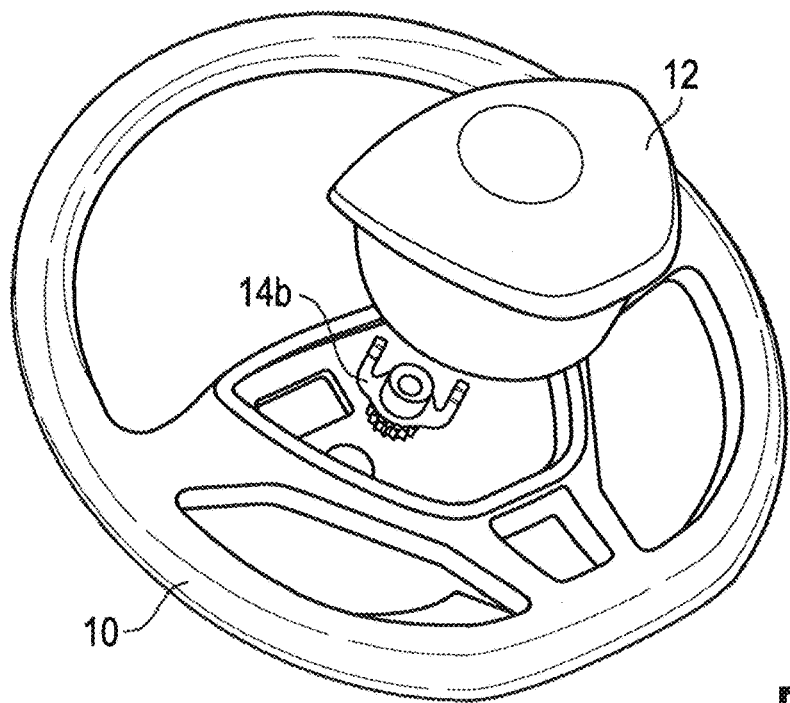
FIG. 1 shows a steering wheel subassembly according to the invention having a bearing unit according to the invention.

FIG. 1 shows a bearing unit of a vehicle subassembly using the example of a steering wheel subassembly, having a vehicle steering wheel 10 and an airbag module 12. The airbag module 12 is shown in a position from which the airbag module 12 can be inserted into the vehicle steering wheel 10.

Figure 2:
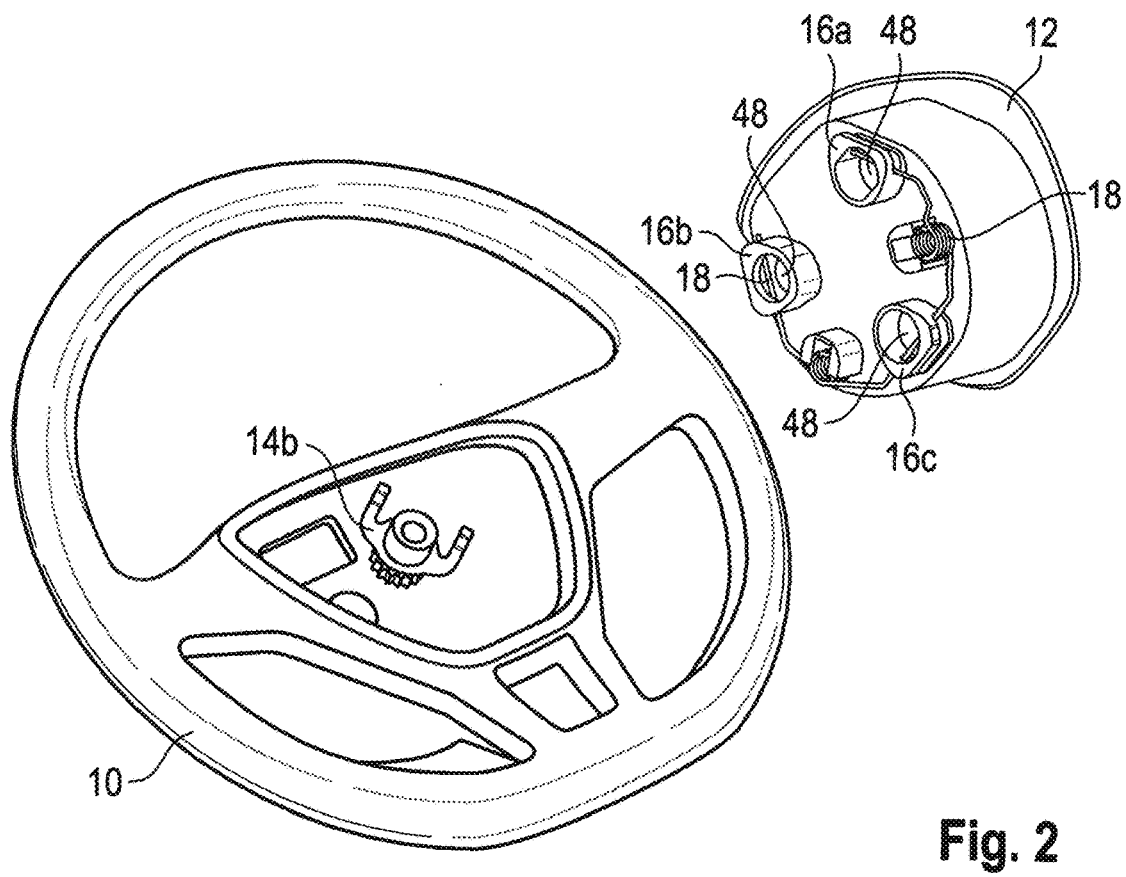
FIG. 2 shows the steering wheel subassembly according to the invention having the bearing unit according to the invention of FIG. 1 in a different perspective.

For orienting and mounting the airbag module 12 on the vehicle steering wheel 10, the bearing unit having adjustable spacer elements 14a, 14b, 14c is used, with only the spacer element 14b being visible in each of the FIGS. 1 and 2.

In FIG. 2, the airbag module 12 is shown in a rotated state so that counter-elements 16a, 16b, 16c arranged on the rear side of the airbag module 12 are visible which, after mounting, interact with the adjustable spacer elements 14a, 14b, 14c in the vehicle steering wheel 10. Mounting of the airbag module 12 on the spacer elements 14a, 14b, 14c is performed with the aid of a component-side fastening element which can act on all spacer elements 14a, 14b, 14c and, according to FIG. 2, is configured as a stop spring 18.

Figure 3:
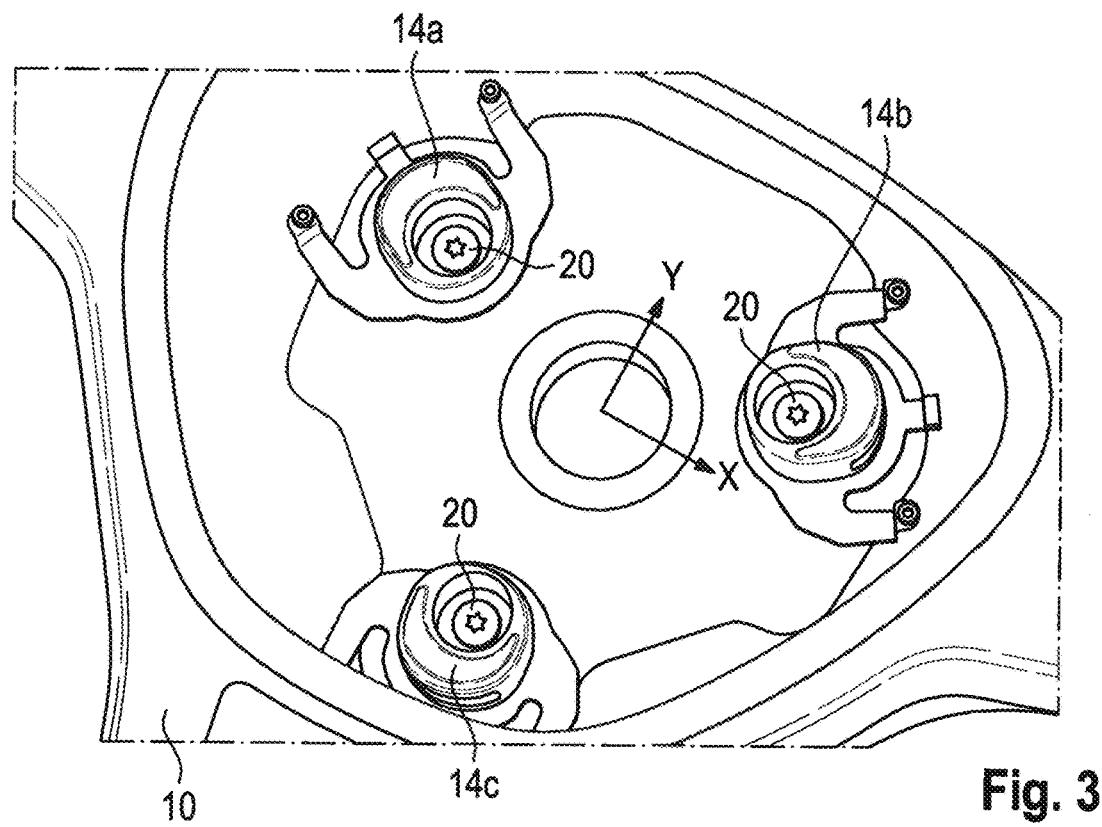
FIG. 3 shows the bearing unit according to the invention comprising three adjustable spacer elements.

The spacer elements 14a, 14b, 14c are fastened to the vehicle steering wheel 10 with the aid of a screw 20 for each spacer element 14a, 14b, 14c (cf. FIG. 3).

Figure 4:
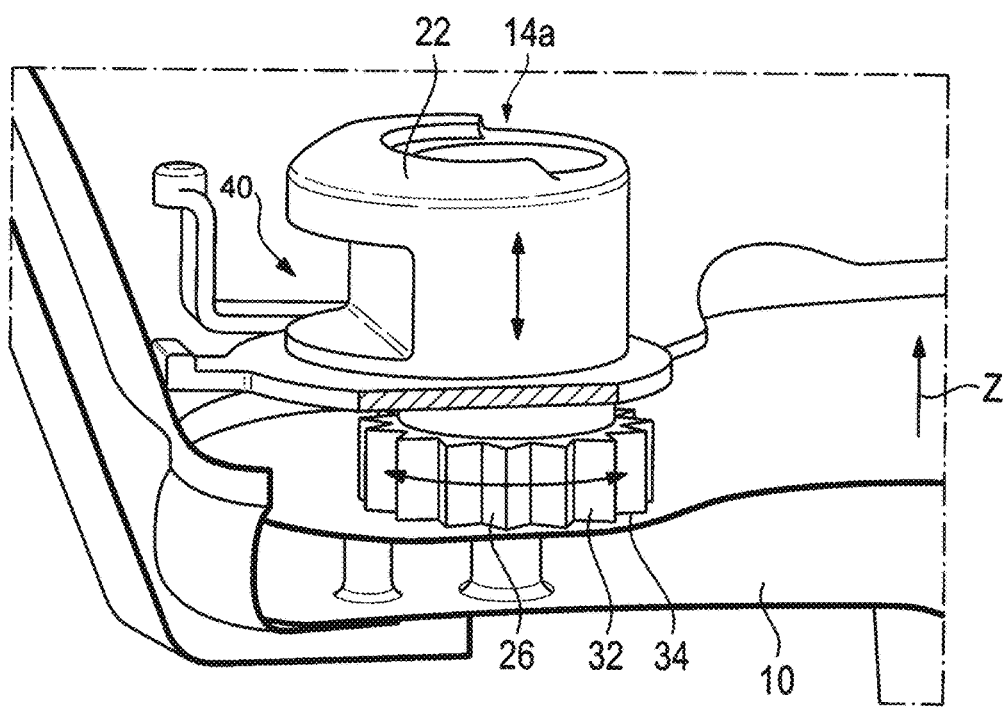
FIG. 4 shows a detail view of a spacer element of the bearing unit according to the invention as set forth in FIG. 3.
Figure 5:
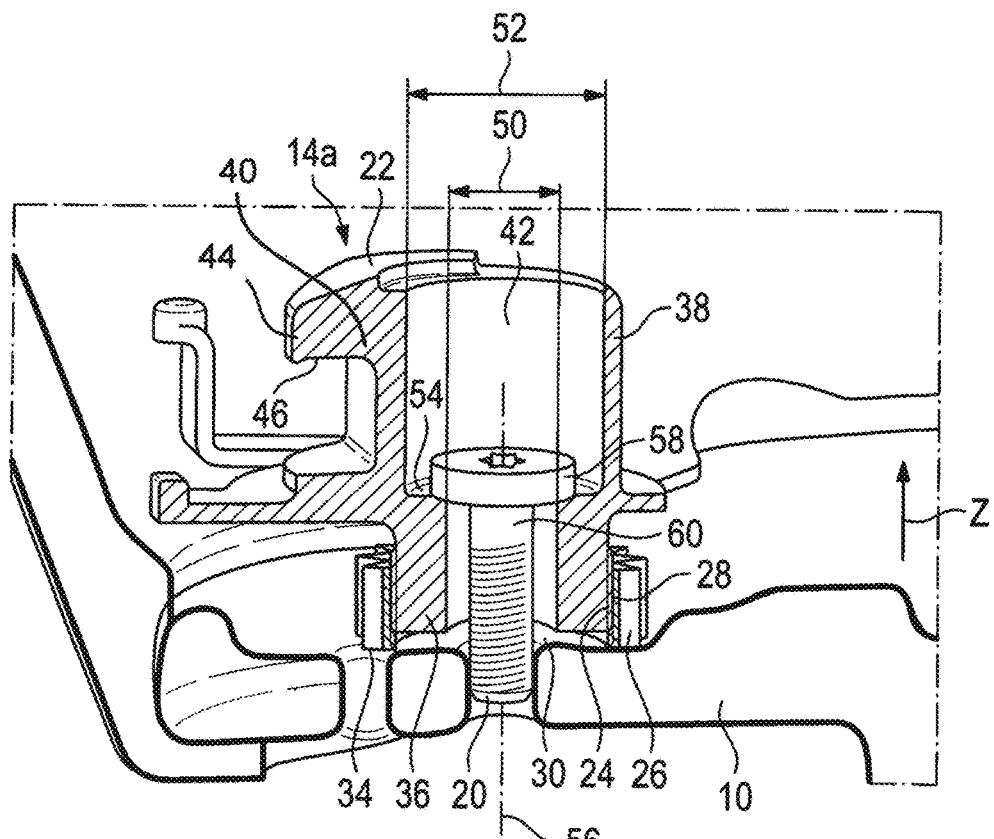
FIG. 5 shows a sectional detail view of the bearing unit including the steering wheel as set forth in FIG. 4.

The spacer element 14a is evident in detail in FIGS. 4 and 5. The remaining spacer elements 14b, 14c are identically structured. The spacer element 14a consists of a component-side holding member 22, which in this case is configured as an airbag module-side holding member, as well as of a support-side holding member 26, which in this case is configured as a vehicle steering wheel-side holding member, wherein the support-side holding member 26 has a first thread 28 and the component-side holding member 22 has a second thread 24. In the shown embodiment, the second thread 24 is a male thread and the first thread 28 is a female thread in a through-hole 30 of the holding member 26. Both threads 24, 28 are in mesh with each other.

The holding member 26 is configured as a nut comprising a toothing 32 arranged at the outer periphery. Said toothing 32 enables the holding member 26 to be driven and to be rotated relative to the holding member 22. This can be performed e.g. manually. Alternatively, a tool which is either manually operated and/or driven by a motor and is laterally attached can be used.

On the side facing away from the holding member 22, the holding member 26 has a front face 34 which in FIG. 4 contacts the vehicle steering wheel 10, more exactly speaking a steering wheel skeleton.

On the whole, the holding member 26 takes the shape of a closed ring.

The holding member 22 substantially takes the shape of a sleeve comprising a thread portion 36, a head portion 38 and a retaining portion 40. Moreover, in the holding member 22 a through-hole 42 is materialized.

At the outer circumferential surface of the thread portion 36 the second thread 24 is provided. In the shown embodiment, the retaining portion 40 comprises a hook 44 formed integrally with the holding member 22 and defining an undercut 46 in which the stop spring 18 can be received and held.

In the shown embodiment, each head portion 38 is designed so that it can be inserted into a recess 48 (see FIG. 2) of a counter-element 16a, 16b, 16c assigned thereto on the component. Across the recesses 48, the stop spring 18 which is axially fixed therein (with respect to a longitudinal screw axis 56 of the screw 20) but is laterally deflectable extends so that a stop connection is provided between the component and the support.

The through-hole 42 has two differently large portions of two different concentric diameters 50, 52. A step 54 forms the transition between the two diameters 50, 52. As is evident from FIG. 5, the smaller diameter 50 is arranged on the side of the holding member 22 facing the vehicle steering wheel 10 and the larger diameter 52 is arranged on the side of the holding member 22 facing the airbag module 12.

Both holding members 22, 26 are held by the screw 20 on the vehicle steering wheel 10. The screw 20 represents a support-side fastener and has a longitudinal screw axis 56, a screw head 58 and a shank 60 including a thread which can be screwed into a counter-thread of the steering wheel skeleton for fastening the spacer element 14a on the vehicle steering wheel 10.

The screw head 58 presses against the step 54 when the screw 20 is tightly screwed into the steering wheel skeleton. The shank 60 passes through the through-hole 42 and the holding member 26. The diameter of the shank 60 is smaller than the diameter 50 of the through-hole 42, and the diameter of the screw head 58 is larger than the diameter 50.

The method for producing the vehicle subassembly shall be described in the following. In the initial state, the holding member 22 of the spacer element 14a is somewhat screwed into the holding member 26. By means of a tool holding the spacer element 14a, the latter is aligned with the through-hole 42 substantially concentrically to the thread in the vehicle steering wheel 10.

In this context, it is emphasized that the thread for the screw 20 need not mandatorily be configured within the steering wheel skeleton of the vehicle steering wheel 10, as a matter of course, it is equally possible to provide appropriate nuts on the rear side of the steering wheel skeleton.

Figure 6:
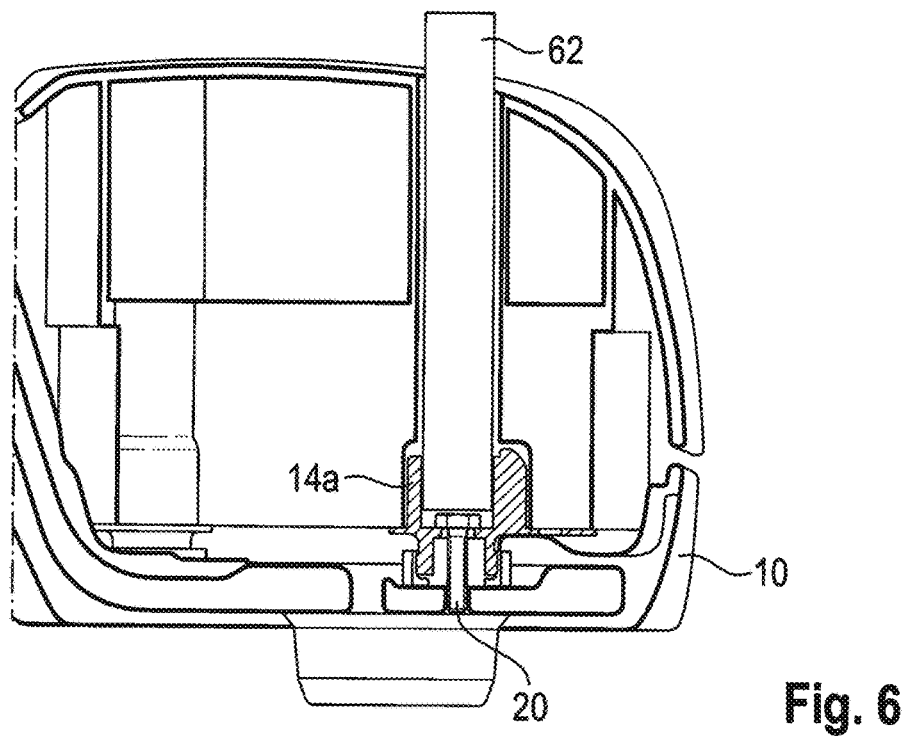
FIG. 6 shows a sectional view of the bearing unit according to FIG. 5 during the proceeding of the method according to the invention.

Apart from the lateral orientation, the spacer element 14a is also oriented in the direction of the Z axis so that the front face 34 of the holding member 26 is located in an orientation plane, also referred to as neutral plane. Said orientation plane is still spaced apart from the assigned later contact surface on the upper side of the vehicle steering wheel 10. This space serves for compensating for all manufacturing tolerances of the steering wheel skeleton as well as of the spacer element 14*a*. Subsequently, the screw 20 is passed through the through-holes 42 and 30 and is screwed into the corresponding thread in the vehicle steering wheel 10 without being tightened. To this end, a rotary tool 62 schematically shown in FIG. 6 can be used. Said tool is preferably motor-driven.

As an alternative to this, the spacer element 14*a* can directly contact the vehicle steering wheel 10. By rotating the holding member 26, the holding member 22 then is further moved away from the steering wheel 10 until it reaches an orientation plane that is defined e.g. by a tool-side stop.

In this phase, the spacer element 14*a* can still be displaced and oriented in the X-Y plane relative to the vehicle steering wheel.

In the following, the holding member 22 is held tightly in position, namely in all three spatial directions, and the holding member 26 is rotated by the tool 62. The tool 62 cannot be attached from the top over the laterally protruding holding member 22 onto the holding member 26, as is easily evident from FIG. 5. Rather, the tool 62 has a driven spur wheel which laterally engages in and catches the toothing 32. The holding member 26 acting like a spindle nut in this case is axially moved, by the rotation, in the direction of the vehicle steering wheel 10 until it abuts on the latter. Said drive of the holding member 26 can be force-controlled, which means that from reaching a predetermined force, the tool 62 is turned off or a torque limitation takes action. The holding member 22 is continued to be held. Now the screw 20 is tightened after the spacer element 14*a* has been brought to the correct length and contacts the vehicle steering wheel 10.

The other spacer elements 14*b*, 14*c* are subsequently appropriately oriented and fastened to the vehicle steering wheel 10. Since the first spacer element 14*a* already is provided in the optimum position, the spacer elements 14*b* and 14*c* then may be appropriately positioned and in said position may be fastened on the vehicle steering wheel 10 by varying the length of the spacer elements 14*b* and 14*c* so that, for example, all undercuts 46 are located in one plane.

Of course, it would also be possible to simultaneously position all of the three spacer elements 14*a*, 14*b*, 14*c* and to fasten them on the vehicle steering wheel 10 by one tool. In this case, for example a holding fixture may be provided which, from the first, ensures the exact Z orientation, but possibly also in addition the X-Y orientation of the retaining elements 22. All tolerances of the vehicle steering wheel 10 and of the spacer elements 14*a* to 14*c*, above all in the Z direction, are compensated in this way.

As a matter of course, there may be provided less than three spacer elements which are individually adjusted. For example, a hook-shaped extension as a spacer element may be fixedly provided or integrally formed on the vehicle steering wheel 10. Starting from said fixing point, the other two spacer elements or the remaining second spacer element then are appropriately oriented and fastened. The non-adjustable spacer element serves so-to-speak as a benchmark.

Figure 7:
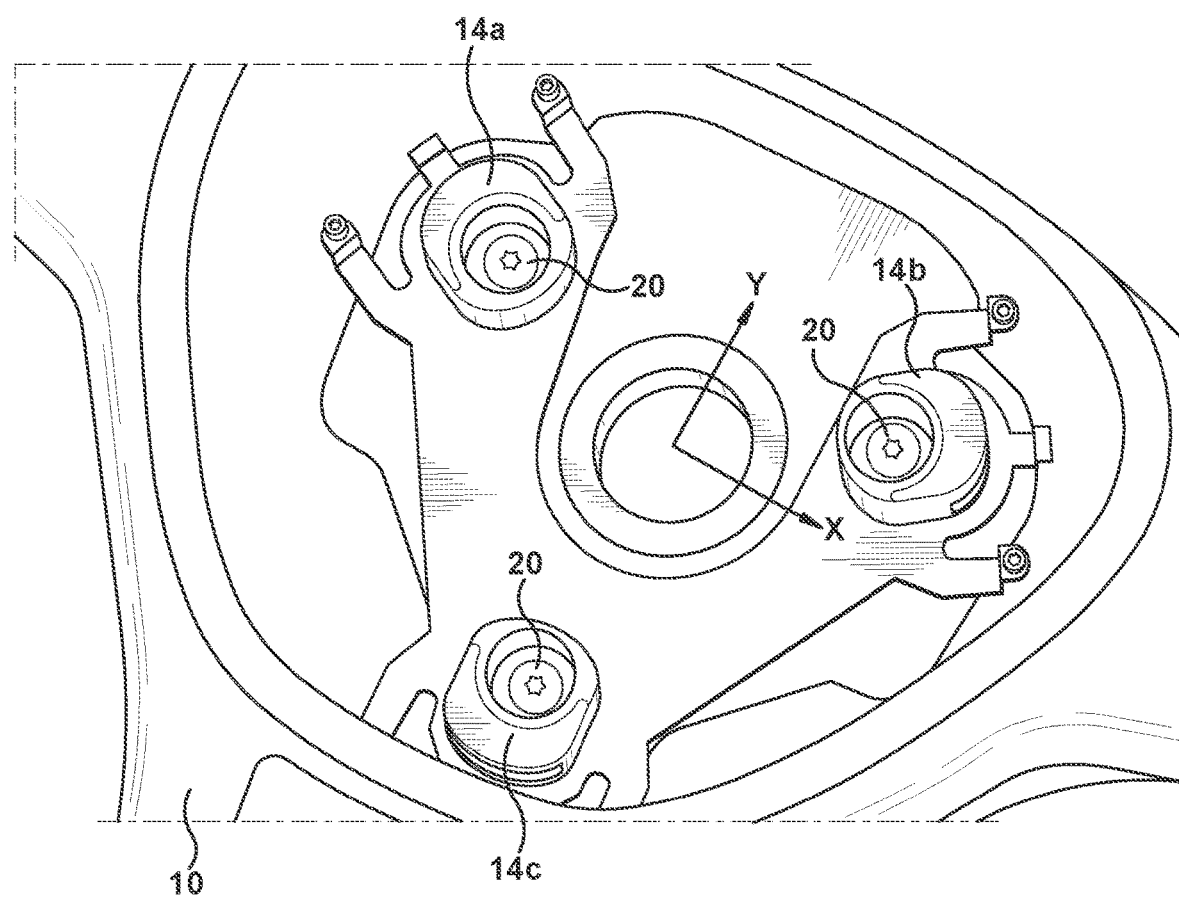
FIG. 7 shows an alternative embodiment of the bearing unit according to FIG. 3.

FIG. 7 shows a bearing unit according to an alternative embodiment. In contrast to FIG. 3, the individual spacer elements 14*a*, 14*b*, 14*c* are not separately configured but are tightly connected to each other in this case. Especially preferred, the spacer elements 14*a*, 14*b*, 14*cc* are integrally connected to each other via the respective component-side holding member 22 thereof.

In this manner, the spacer elements 14*a*, 14*b*, 14*c* are coupled to each other for an X-Y orientation. In the Z direction, adjustment is performed at individual adjustable spacer elements 14*a*, 14*b*, 14*c*.

As compared to plural separate spacer elements 14*a*, 14*b*, 14*c*, a desired positioning of the bearing unit can be achieved with lower mounting effort by the substantially rigid connection of the spacer elements 14*a*, 14*b*, 14*c*. Furthermore, especially the influence of an uneven or slanting steering wheel-side fastening surface on the positional accuracy of the bearing unit can be reduced.

The invention claimed is:

1. A bearing unit for connecting a vehicle-mounted support to a component which is to be fastened on the support, the vehicle-mounted support being a steering wheel (10), the component being an airbag module (12), the bearing unit comprising:
    at least one adjustable spacer element (14*a*, 14*b*, 14*c*) for orienting the position of the component on the support, and
    a first fastener by which the support or the component can be fixed on the spacer element (14*a*, 14*b*, 14*c*),
    wherein the spacer element (14*a*, 14*b*, 14*c*) has a support-side holding member (26) comprising a first thread (28), a component-side holding member (22) comprising a second thread (24) and a second fastener by which the support-side holding member (26) can be fixed on the support or the component-side holding member (22) can be fixed on the component,
    wherein the second thread (24) engages in the first thread (28) in such a way that the length of the spacer element (14*a*, 14*b*, 14*c*) varies by a rotational movement of the support-side holding member (26) relative to the component-side holding member (22).

2. The bearing unit according to claim 1, wherein the support-side holding member (26) or the component-side holding member (22) is in the form of a nut and the other one of the two holding members (22, 26) is in the form of a sleeve screwed into the nut.

3. The bearing unit according to claim 2, wherein the nut at least in portions has a toothing (32) on its outer circumferential surface.

4. The bearing unit according to claim 1, wherein the first fastener is arranged on the component side and comprises a stop spring (18) which can be fastened, on the one hand, to the component-side holding member (22) and, on the other hand, to the component so as to releasably couple the component to the spacer element (14*a*, 14*b*, 14*c*).

5. The bearing unit according to claim 4, wherein a holding fixture into which the stop spring (18) can be inserted and which supports the same is integrally formed on the component-side holding member (22).

6. The bearing unit according to claim 5, wherein the holding fixture is an integrally formed hook (44).

7. The bearing unit according to claim 1, wherein the second fastener is arranged on the support side and is a screw (20) projecting through through-holes (30, 42) in the support-side and component-side holding members (22, 26) and being adapted to be screwed into the support.

8. The bearing unit according to claim 7, wherein the component-side holding member (22) the through-hole (42) has a step (54) for contacting a screw head (58) and/or the through-hole (42) in the component-side holding member (22) is oversized as compared to the screw (20) so that the spacer element (14a, 14b, 14c) can be displaced transversely to a longitudinal screw axis (56) relative to the not yet tightened screw (20).

9. The bearing unit according to claim 1, comprising plural spacer elements (14a, 14b, 14c) adjustable independently of each other, wherein the component-side fastener is supported on all of the spacer elements (14a, 14b, 14c).

10. A steering wheel subassembly comprising a vehicle steering wheel (10) and an airbag module (12), wherein the vehicle steering wheel (10) and the airbag module (12) are connected to each other by a bearing unit according to claim 1.

11. A method for producing a vehicle subassembly comprising a vehicle-side support, a component to be fastened to the support and at least one bearing unit according to claim 1, the vehicle-mounted support being a steering wheel (10), the component being an airbag module (12), the method comprising the following steps of:
 a) arranging at least one adjustable spacer element (14a, 14b, 14c) relative to the support,
 b) rotating either of the two holding members (22, 26) relative to the other one of the two holding members (26, 22) for adjusting the length of the spacer element (14a, 14b, 14c),
 c) locking the support-side fastener and thus the adjusted spacer element (14a, 14b, 14c) on the support, and
 d) locking the component by attaching the component-side fastener to the component and to the spacer element (14a, 14b, 14c).

12. The method according to claim 11, wherein step a) the spacer element (14a, 14b, 14c) is arranged at a distance from the support and in step b) either of the two holding members (22, 26) is rotated relative to the other so that the spacer element (14a, 14b, 14c) axially abuts on the support.

13. The method according to claim 11, wherein in step c) the support-side or the component-side holding member (22, 26) is in the form of a nut and is rotated via a toothing (32) arranged at least in portions on an outer circumferential surface of the nut.

14. The method according to claim 11, wherein the support-side fastener is a screw (20) which prior to step b) is screwed into the support without being axially twisted so that in step b) the spacer element (14a, 14b, 14c) may be varied in its length and in that as late as in step c) the screw (20) is tightened.

15. The method according to claim 11, wherein prior to step c) the at least one spacer element (14a, 14b, 14c) is laterally displaced and is laterally oriented relative to the support.

16. The method according to claim 11, wherein three adjustable spacer elements (14a, 14b, 14c) which can be adjusted independently of each other are used.

17. The method according to claim 11, wherein in step a), all of the spacer elements (14a, 14b, 14c) are held oriented relative to each other in a tool, are moved toward the support and are oriented relative to the support.

* * * * *